(12) United States Patent
Kodde

(10) Patent No.: US 10,846,795 B2
(45) Date of Patent: Nov. 24, 2020

(54) ORDER BOOK MANAGEMENT DEVICE IN A HARDWARE PLATFORM

(71) Applicant: ENYX SA, Paris (FR)

(72) Inventor: Edward Kodde, Paris (FR)

(73) Assignee: ENYX SA, Paris (FR)

( * ) Notice: Subject to any disclaimer, the term of this patent is extended or adjusted under 35 U.S.C. 154(b) by 609 days.

(21) Appl. No.: 14/502,523

(22) Filed: Sep. 30, 2014

(65) Prior Publication Data

US 2015/0095207 A1 Apr. 2, 2015

(30) Foreign Application Priority Data

Oct. 1, 2013 (EP) .................................. 13306358

(51) Int. Cl.
*G06Q 40/04* (2012.01)

(52) U.S. Cl.
CPC .................................. *G06Q 40/04* (2013.01)

(58) Field of Classification Search
None
See application file for complete search history.

(56) References Cited

U.S. PATENT DOCUMENTS

| | | | |
|---|---|---|---|
| 5,764,978 A * | 6/1998 | Masumoto | G06F 16/23 |
| 5,892,962 A * | 4/1999 | Cloutier | G06F 15/8023 712/10 |
| 6,321,240 B1 | 11/2001 | Chilimbi et al. | |
| 6,330,556 B1 | 12/2001 | Chilimbi et al. | |
| 7,251,629 B1 * | 7/2007 | Marynowski | G06Q 40/04 235/379 |
| 7,401,333 B2 * | 7/2008 | Vandeweerd | G06F 9/30014 718/102 |
| 7,552,077 B1 * | 6/2009 | Schluetter | G06Q 40/04 705/36 R |
| 7,813,994 B1 * | 10/2010 | Ebersole | G06Q 40/04 705/37 |

(Continued)

FOREIGN PATENT DOCUMENTS

| | | |
|---|---|---|
| EP | 1857930 A2 | 11/2007 |
| WO | 2008154306 A1 | 12/2008 |

OTHER PUBLICATIONS

Wikipedia, "Data Structure Alignment", entire document.*

(Continued)

*Primary Examiner* — Christopher Bridges
(74) *Attorney, Agent, or Firm* — BakerHostetler

(57) ABSTRACT

An order management device and method of implementing that device in an integrated circuit. The order management device including a memory having a first and second data structure. The first data structure stores orders associated with a set of P limits. The second data structure includes the limits in a list of N limits that are not contained in the subset P, the entries in the second data structure being allocated dynamically. A first management core processes input commands related to an order, updates the first data structure and generates at least one update command to be sent to a second management core. The second management core updates the second data structure in response to the update. The first management core processes input commands independently of the update command processing by the second processing core.

22 Claims, 7 Drawing Sheets

(56) References Cited

U.S. PATENT DOCUMENTS

| | | | | |
|---|---|---|---|---|
| 7,856,545 B2* | 12/2010 | Casselman | G06F 15/7867 | 712/34 |
| 7,917,912 B2* | 3/2011 | Gershinsky | H04L 63/0227 | 709/204 |
| 8,301,593 B2* | 10/2012 | Hoffmann | G06F 11/2097 | 707/615 |
| 8,843,408 B2* | 9/2014 | Singla | G06Q 40/06 | 705/36 R |
| 9,443,269 B2* | 9/2016 | Battyani | G06Q 40/04 | |
| 10,037,568 B2* | 7/2018 | Taylor | G06Q 40/04 | |
| 2002/0161687 A1* | 10/2002 | Serkin | G06Q 40/04 | 705/37 |
| 2002/0184237 A1* | 12/2002 | McFeely | G06Q 10/10 | |
| 2004/0103054 A1* | 5/2004 | Singer | G06Q 20/10 | 705/37 |
| 2007/0208657 A1* | 9/2007 | Petrino | G06Q 40/06 | 705/37 |
| 2008/0243675 A1* | 10/2008 | Parsons | G06Q 40/04 | 705/37 |
| 2009/0030828 A1* | 1/2009 | Haller | G06Q 40/00 | 705/37 |
| 2010/0241758 A1* | 9/2010 | Oddie | G06Q 10/06 | 709/231 |
| 2011/0078141 A1* | 3/2011 | Fakeih | G06F 16/21 | 707/736 |
| 2012/0095893 A1* | 4/2012 | Taylor | G06Q 40/04 | 705/35 |
| 2012/0185439 A1* | 7/2012 | Chen | G06F 17/30516 | 707/661 |
| 2012/0203683 A1* | 8/2012 | Duquette | G06Q 40/06 | 705/37 |
| 2013/0226771 A1* | 8/2013 | Macri Lassus | G06Q 40/04 | 705/37 |
| 2014/0025549 A1* | 1/2014 | Kline | G06Q 40/04 | 705/37 |

OTHER PUBLICATIONS

Wikipedia, "Adaptive replacement cache", entire document.*
Google search, Least Recently Used scheme, Aug.12, 2004.*
Wikipedia, "Cache algorithm", entire document.*
Wikipedia, "B+ tree", Aug.17, 2007, entire document.*
Lockwood et al. and Blott et al., "A Low-Latency Library in FPGA Hardware for High-Frequency Trading (HFT)", 2012, IEEE, entire document (Year: 2012).*
John W. Lockwood, et al., "A Low-Latency Library in FPGA Hardware for High-Frequency Trading (HFT)", 2012 IEEE 20th Annual Symposium on High-Performance Interconnects, Aug. 22, 2012, pp. 9-16, XP032236263.
Hari Subramoni, et al., "Streaming, Low-Latency Communication in On-line Trading Systems", 2010 IEEE International Symposium on Parallel & Distribution Processing , Workshops and PHD Forum, Apr. 19, 2010, pp. 1-8, IEEE, Piscataway, NJ, USA, XP031680088.
Eric K. Lee, et al., "When to Use Splay Trees", Software—Practice and Experience, Dec. 1, 2007, pp. 1559-1575, vol. 37, No. 15., Wiley & Sons, Bognor Regis, GB, XP007917649.

* cited by examiner

ORDER BOOK MANAGEMENT DEVICE IN A HARDWARE PLATFORM

CROSS-REFERENCE TO RELATED APPLICATION

This application claims priority to foreign European patent application No. EP 13306358.6, filed on Oct. 1, 2013, the disclosure of which is incorporated by reference in its entirety.

FIELD OF INVENTION

The invention generally relates to data processing systems, and more particularly to a method and a device for managing order books in a hardware platform.

BACKGROUND

As there is a growing need for faster processing of large volumes of data in financial industries, data processing systems based on clusters relying on general-purpose CPUs show a number of limitations. Indeed, if cluster approaches involve inexpensive hardware and provide tools that simplify the development, they have a number of constraints which are all the more significant as the requirement for high performance computing increases: high electricity consumption, costly maintenance, important space required for data centers. Further, the overall performance obtained with a cluster does not increase proportionally with the number of clusters. Unlike the cluster approach, data processing systems based on FPGAs allows execution of complex tasks in parallel with an important throughput, with a limited number of machines equipped with FPGAs. Accordingly, this hardware approach appears particularly suitable for the development of applications in the field of financial and investment industries where fast calculation is key to remain competitive.

An FPGA (acronym for Field-programmable gate array) designates an integrated circuit which can be configured after manufacturing. The configuration is generally specified using a Hardware description language (HDL). FPGAs contain a huge number of components ("logic blocks"), and a hierarchy of reconfigurable interconnections that allow the blocks to be "wired together". Logic blocks can be configured to perform complex combinational logic, or merely simple basic logical operations (boolean AND, OR, NAND, XOR etc.). As FPGA can perform parallel calculations, a same algorithm can be executed simultaneously for a number of independent inputs in only a few clock cycles. FPGAs are thus particularly suited for executing complex computation very fast.

For these reasons, more and more market data processing systems are designed using FPGAs.

A market data processing system generally comprises an order book management device (also known as a limit aggregation and book building device) which performs limit aggregation and order book building. The order book management device takes the orders identified in the input commands received via the market. The orders may be initially emitted by traders and filtered by the market computing systems according to predefined criteria. For example, they may be filtered if they are erroneous or if they have been executed immediately when received by the market computing systems. The order book management device sorts the received orders by order book ("book building" functionality) using the instrument identifier passed in each command. Each order book comprises a BID (or buy) side and an ASK (or sell) side. Each order listed in an order book is associated with a tradable object and comprises a price and quantity information. As used herein, the term "tradable object" refers to any object that can be traded in some quantity at a particular price, such as for example financial products. The order book management device is then used to match the orders of the same order book and side by price, adding their quantity (limit aggregation functionality).

One of the roles of the order book management devices is to update the order books depending on the input commands received from the market participants, over the exchange's network, such as a command to add, delete or modify an order. However, in conventional order book management devices, such update operations generate an important overhead and result in an important latency.

SUMMARY OF THE INVENTION

In order to address these and other problems, there is provided an order book management device as defined in the appended independent claim 1, and a method as defined in appended claim 15. Preferred embodiments are defined in the dependent claims.

The invention thus provides an improved order book management device having a low latency, while still being able to withstand the command rate associated with the exchanges' 10G networks. Further, the latency and rate of the proposed order book management device are optimized with respect to conventional order book management devices. In particular, the latency has slight variations, and more generally undergoes far less variations than with conventional order book management devices.

It is another advantage of the invention to output both the previous version and the new version of the books (before and after application of the commands contained in a packet).

Further advantages of the present invention will become more apparent from the following detailed description considered with reference to the accompanying drawings.

BRIEF DESCRIPTION OF THE DRAWINGS

Embodiments of the present invention will now be described by way of example with reference to the accompanying drawings in which like references denote similar elements, and in which.

DETAILED DESCRIPTION

Figure 1:
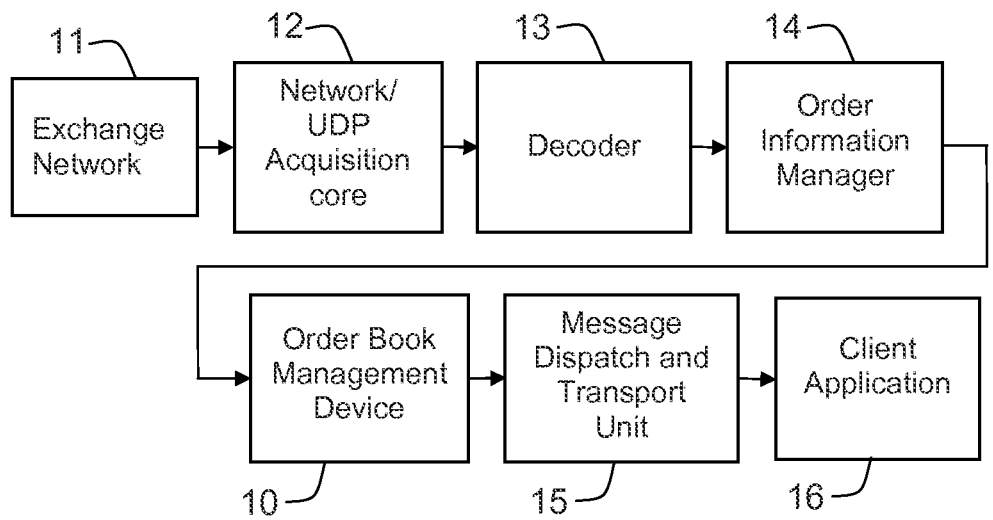
FIG. 1 represents an exemplary market data processing system.

Referring to FIG. 1, there is shown an exemplary market data processing system 100 provided to acquire and process market data delivered from one or more data sources such as financial exchanges.

The term "market data" as used herein refers to data received in the form of a data stream from a number of external sources that comprise financial quote and trade-related data associated with equity, fixed-income, financial derivatives, currency, and other investment instruments. Market data are a key element of financial and investment industries. The way they are handled (latency, availability, quality, etc.) directly impacts the competitiveness of such industries. An important feature of market data is their update frequency. Indeed, for strategic and competitive purpose real time updates are required. For example, delivery of price data from exchanges to users approaches real-time.

The first step of a market data processing chain comprises a data acquisition phase which in network applications consists of Network (generally UDP or TCP) acquisition 12 and is generally performed by the NIC (Network Interface Card) and the Operating System's Network Stack, as well as a data packet decoding phase. The decoding phase is performed by at least one decoder 13 (also referred to as a "market data packets decoder") that interacts with the feed sources for handling the market data streams received according to a given source-specific protocol (e.g. FAST) from exchange networks 11, and decodes them.

More particularly, the decoder 13 is configured to convert the data streams from their source-specific format into an internal format (data normalization process). According to the message structure in each data feed, the decoder 13 processes each field value with a specified operation, fills in the missing data with value and state of its cached records, and maps it to the format used by the system. The decoder 13 may then call selected Order Management routines based on the decoded message.

The market data processing system 100 may further comprise an order information manager 14 comprising at least one memory for storing details related to each order to retrieve them when needed.

As shown, the market data processing system 100 may also comprise a message dispatch and transport unit 15 for formatting the processed data in messages and dispatching them to selected client applications 16 for further processing and decision taking. When client applications 16 are located on different servers, message transport may be done over a network.

The market data processing system 100 further includes an order book management device 10 (which may be also referred to as a "limits aggregation and book building device") for aggregating the orders that are pending into order books, present for each instrument a list of orders, possibly aggregated into limits and sorted by price. Generally, client applications 16 essentially need to access the first limits of a book. Alternatively, client applications may access the orders directly.

As used herein, an order book refers to the electronic collection of the outstanding limit orders for a financial instrument, such as for example a stock. Further, as used herein:

the terms "order" or "limit order" or "market order" refer to an order to buy or sell a given quantity of a financial instrument at a specified limit price or better, or at the market price for market orders.

the term "limit" refers to a "line" or "entry" in an order book that corresponds to one or several orders. When it corresponds to several orders, it may also be referred to as an "aggregated limit". Limits are aggregated by price, i.e. all orders with a same price have their quantities added up to form the limits quantity. An aggregated limit may also have an "order count" property reflecting the number of orders that have been aggregated in this limit. The position of a limit inside a book is referred to as a "line number" or a "level".

The size or quantity of an order designates the number of shares to be bought or sold.

Order Books comprise limits which are sorted by price. The order book management device 10 may be configured for taking the orders which are mixed in the memory of the order information manager 14 and sent by said order information manager 14 to the order book management device 10 each time they are modified or otherwise referenced in a command and sort them by book, using the instrument identifier passed in each command. In some cases, order books may comprise orders from several instruments or the same instrument on different markets (consolidated books).

The order book management device 10 may be further configured to take the individual orders of the same book and side (bid or ask side) and match them by price, adding their quantity. This process is generally called "limit aggregation".

It should be noted that the term "command" as used in the present description may differ from the term « message ». Indeed, while a « command » designates a message decoded by the decoder 13, a « message » represents a suite of bytes according to a given data protocol (such as FAST, Binary or FIX format). It is generally transmitted on a generic bus in several clock cycles depending on its size with respect to the bus width. On the contrary, a command may be transmitted in only one clock cycle on a parallel bus. According to one aspect of the invention, each command received in the input of the order book management device 10 may comprise at least some of the following parameters among: an operation code (opcode), a book identifier, a bit related to the book side, a price, a quantity, an order count and a level.

When the opcode corresponds to a by-limit command (limit creation, for example), the price, quantity and order count can be used to update the limit at the level indicated in the command. In the example of a limit creation, the price, quantity and order count can be copied to the limit at the level indicated by the command, and the limits below it shifted down.

In conventional order book management systems, an order generally remains in the order book until it is fully executed (its size falls to zero as a result of trades) or deleted. When an order is executed, an execution message is generally sent from the exchange to the clients. This message generally contains the size and the price at which the order(s) were executed. The clients then may update their books accordingly, removing the executed size from the book.

Partial executions may occur as a result of trades for less than the entire size of the order.

Figure 2:
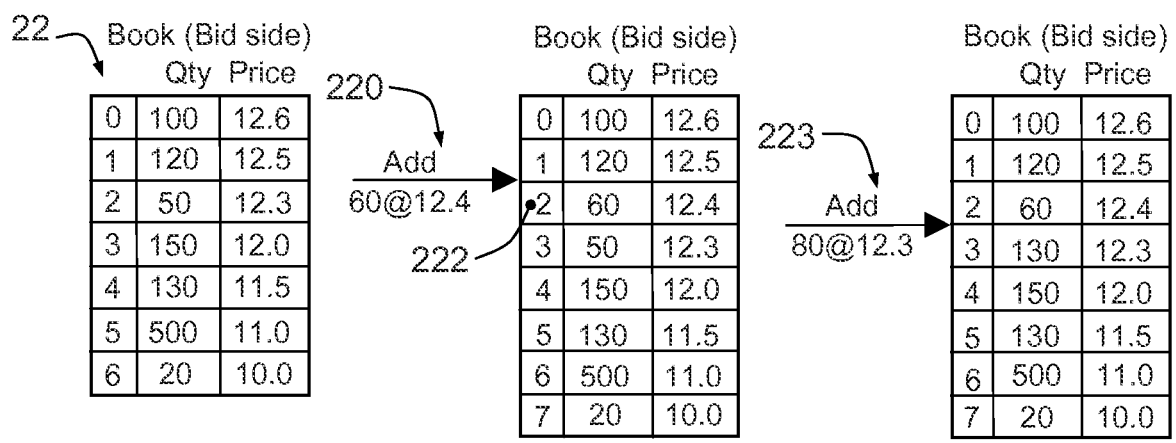
FIG. 2 shows exemplary updates of an order book.

FIG. 2 represents an exemplary order book 20 containing 7 limit orders, on the bid side. Orders on the bid side represent orders to buy. The ask side (not represented) refers to orders to sell. The limit orders maintained in the order book 20 comprise:

An order to buy 100 shares (order quantity) at 12.6 $ (price);
An order to buy 120 shares at 12.5$;
An order to buy 50 shares at 12.3 $;
An order to buy 150 shares at 12.0 $;
An order to buy 130 shares at 11.5 $;
An order to buy 500 shares at 11.0 $;
An order to buy 20 shares at 10.0 $.

The price levels associated with these limit orders are respectively $12.6, $12.5, $12.3, $12.0, 11.5 $, 11.0 $, and 10.0 $. The best bid designates the highest bid price, which in the example is $12.6. The difference between the best bid (highest price in the bid side) and the best ask (lowest price in the ask side) is referred to as "the spread" and the midpoint designates the average value between the best bid and the best ask.

A market data processing system can receive a variety of messages from the market, including, for "by-order" markets (for example, NASDAQ, BATS):

An add message for requesting addition of an order to an order book;
A cancel or delete message for requesting deletion (total or partial) of an order from an order book,
An execute message, requesting execution (total or partial) of an order from an order book,
A replace or modify message for requesting modification of one or more properties of a limit order comprised in an order book (for example, modification of the quantity and/or price).

The messages may further comprise for "by-limit" markets (for example, CME, EUREX):

A limit creation message, to create a limit, indexed by its level, and shift all the limits under it down,
A limit deletion message for deleting a limit in the book, indexed by its level, and shifting all the limits under it up, and
A limit modification message, to modify a limit, indexed by its level.

The messages may also comprise for "by-price" markets (for example, LIFFE, TSE) a price update message for updating a limit indexed by its price; such message creates the limit if it does not already exist, and deletes it if its quantity reaches 0.

The messages may be transformed into commands by the cores which are provided upstream the Decoder 13 and the Order Information Manager 14". The commands thus obtained may comprise:

An add command to add a quantity and an order count at a certain price,
A delete command to subtract a quantity and an order count at a certain price,
Commands to create, modify and delete limits at a given level by shifting the limits under the given level accordingly.

Transforming "by-order" and "by-price" commands into add and delete commands allows to execute the commands out of order. For example an order may be created, (add message, with quantity 100), another order with the same price may be modified (modify message with new quantity 200), and a third order may be deleted completely (delete message). The Order Information Manager 14 may be configured to memorize the current state of all the pending orders, including their quantities. For example, the old quantities may be 0 for the first order (since it did not exist), 500 for the second order and 200 for the third one. The Order Information Manager 14 may then output an add command with a quantity of 200, a delete command with a quantity of 300 and a delete command with a quantity of 200. The quantities represent the difference (or "delta") between the current quantity and the new quantity the system has just received for each order. The "add" and "delete" commands can be executed in any order, the resulting total quantity of the limit in Order Book Management Device 10 remaining the same. This ability to execute commands out of order makes it possible for the top-of-book management core 2 and the bottom-of-book management core 3 to operate asynchronously.

Accordingly, it is possible to add a limit order to an order book. As shown in FIG. 2, the addition of a first order "add 60@12.4" (designated by reference 220) creates a new limit 222 at price "12.4", and the addition of a second order "Add 80@12.3" (designated by reference 223) adds more volume to limit number "3" as a limit at price "12.3" already exists in the order book 20.

In conventional order book management devices, each new limit order is inserted in the order book so that the order book remains ordered by price, from the highest to the lowest on the bid side, and from the lowest to the highest on the ask side.

It is also possible to remove a limit order from the order book (cancel/remove operation). This operation simply removes the designated limit order from the order book 20 while maintaining the remaining limit orders sorted by price. Also, it is possible to reduce the quantity of each order (cancel/replace update). Such operation cancels the limit order and then replaces it with another order at the same price, but with a lower quantity. Generally, cancel orders can only lower the size of an order, but not increase it.

Each limit order added to the order book is assigned a unique identifier by the exchange. The limit order identifiers (also referred to as order identifier or order ID) are used to identify the limit orders that are to be updated, when receiving a cancel, cancel/replace request.

The inside market refers to the best bid (buy) and the best ask (sell) in a given order book.

Generally, market processing systems comprise order matching engines (not shown) which are configured to determine if a market order on a given side (bid or ask) "hits" a limit order on the other side (respectively ask or bid) of the inside market (in such case a trade occurs). As used herein, a market order refers to an order requiring to immediately buy or sell a given quantity of a stock at the best available prices.

In conventional order book management devices, limits are sorted by price so that the client application can have an easy and quick access to the top of the book (represented by the first limits). In addition to the price and quantity, a limit can contain the number of orders it is made of (when the quantities of different orders having a same price level have been merged in a unique limit by adding their quantities).

When implemented in software, the order book management device 10 may use a variety of data structures to manage the limits depending on the desired performance and amount of instruments or books kept up to date. In some existing order book management devices, a simple table or array is used. However, this is only suitable when few books are processed and when it is acceptable to spend CPU (acronym for "Central Processing Unit") time shifting the limits in the books. In other order book management devices, more complex data structures (such as heaps, trees, etc.) are used to avoid shifting too many data. However, this results in a more difficult and slow access to the deeper limits.

Further, existing software implementations of the order book management device become slow and inefficient when processing an important number of books, mostly because it requires handling huge amounts of data and leads to lots of CPU cache misses. Such solutions are not suitable for firms that need to process all the instruments on a given set of markets. In such software approach, the load can be easily spread across several servers, each processing only some of the books. However, this requires routing the orders to the correct server using the instrument identifier, which may add extra network hops. Other drawbacks of such approach include the cost of the servers, the power consumption, rack space usage, and the latency of the total system.

Other existing solutions resort to hardware acceleration to overcome the deficiencies of the software approach, such as US20120095893 which provides a book building system. This solution however requires more transfers back and forth between the CPU and the hardware acceleration card. It helps offload some processing from the CPU, but is not as optimized for latency.

The invention provides an improved order book management device 10 with an optimized latency.

Figure 3:
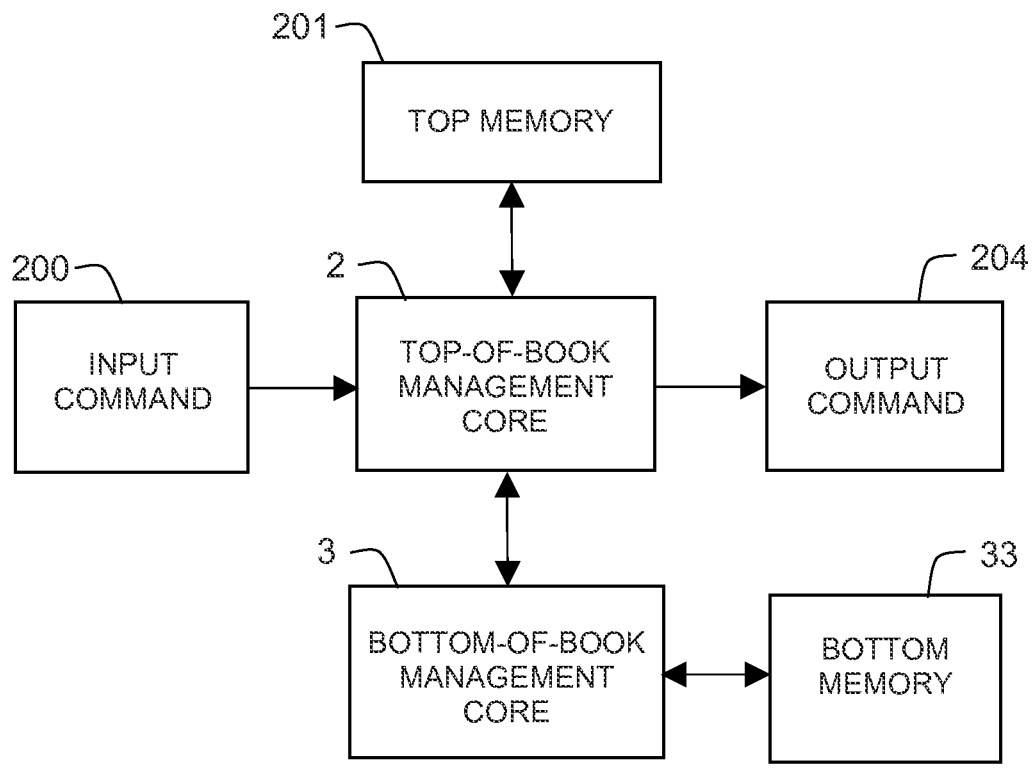
FIG. 3 represents the order book management architecture, in accordance with certain embodiments of the invention.

FIG. 3 represents the general structure of the order book management system 10 according to certain embodiments of the invention. The order book management system 10 comprises a first management core 2, thereinafter referred to as "top-of-book management core", and a second management core 3, thereinafter referred to as "bottom-of-book management core".

The top-of-book management core 2 is configured to manage the top part of each order book while the bottom-of-book management core 3 is provided to manage the bottom part of the book. The top part of each order book (also referred to thereinafter as "top-of-book") comprises, for each side of the book, a list of P limits having the best prices, depending on the side (highest prices in the BID side or lowest prices in the ASK side) among all the N limits in the book. Each limit may comprise a plurality of orders and may be associated with a quantity, price and order count information.

The bottom part of the order book (also referred to thereinafter as "bottom-of-book") maintains the remaining N-P limits, each being associated with a quantity, price and order count information. Accordingly, the limits of the bottom part of the order book have lower (or higher, depending on the side) prices than the prices associated with top part of the order book. Advantageously, the top part of the order book is maintained in a different data structure as the bottom part of the order book. Further, the operation of the bottom-of-book management core 3 is triggered by the top-of-book management core 2 depending on the received input commands.

Such twofold architecture of the order book management device 10 according to the invention has the advantage to optimize the processing performances. In particular, it allows processing differently the top of each order book from the bottom of the order book, which optimizes latency as the top of the order book needs to be updated quickly in order to send the processed data to the client applications, while the bottom of the order book can be updated more slowly.

Clients can subscribe to the books of their interest via an API that configures the Message Dispatch and Transport Unit 15 to forward to them the modifications applied to a configurable depth of the selected books. This allows different clients to subscribe to different subsets of the books processed by the system. In the preferred embodiments of the invention, a client can only subscribe to the top part of the book and cannot subscribe to the bottom part of the book. This is because the bottom of book management core 3 is generally not connected to the Message Dispatch and Transport Unit 15.

The number P of limits maintained in the top part of the order book may be chosen depending on a number of factors or criteria for enabling optimization of resources and performances. In particular:

The number P may be chosen to optimize the resources needed to store and update the book. Indeed the higher the number P is, the longer it takes to load a book, and the more resources it takes to store and update it; and/or The number P may be chosen to be higher than the depth of the top part of the book the client wants to subscribe to. Additionally, the number P may be selected to be a few limits higher than the size of the book part to which the client subscribes to, for performances reasons; and/or To maximize memory use efficiency, the number P may be chosen such that:

$$P*S=N*W$$

where N is an integer, S is the size of a limit in bits, and W is the memory word width in bits.

Alternatively, the order book management device may be configured to load half of the book (only the bid side or the ask side, whichever corresponds to the side received in the command) in the top part of the book, thereby reducing the time required for loading a book.

The input commands 200 are received by the top-of-book management core 2 which interacts with a top memory 201 provided to store the top part of books. Output commands 204 are generated based on the processing of the top-of-book management core 2 and the bottom-of-book management core 3 which interacts with a bottom memory 33 provided to store the bottom part of books.

Figure 4:
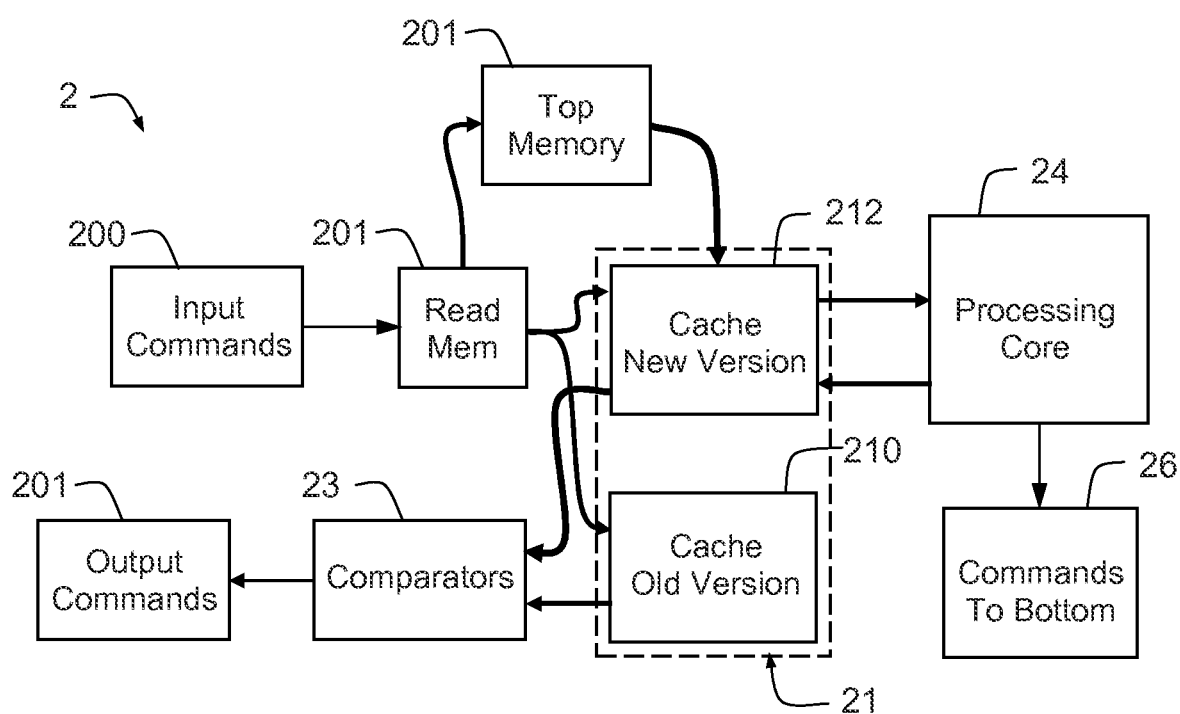
FIG. 4 shows the architecture of the top-of-book management core, according to certain embodiments of the invention.

Reference is now made to FIG. 4 which represents the architecture of the top-of-book management core 2. The top part of each book is loaded in a first data structure stored in an internal cache 21. The internal cache 21 comprises a set of entries, each entry storing such a data structure for an order book. The first data structure is processed by the top-of-book management core 2. The internal cache 21 is provided to hide the latency of the external memory. This allows processing several instructions on a same order book in a row, and avoids back-pressuring the processing part which would affect timings because of the very wide buses.

The cache entries may be allocated according to a "Least Recently Used" (LRU) scheme. More specifically, when a cache entry is required to copy an order book in it, the least recently used entry is overwritten with the new book. For each cache entry, the "old version" 210 of the book before processing, and the "new version" 212 of the book (version being processed) are stored. Thus, at the end of each packet, after the commands in the packet have been applied on the "new version" cache 212, only the limits that have been modified can be sent to the client application, thereby saving bandwidth and processing power. The comparison between the new and the old versions of the books may be performed by the array of comparators 23 to detect updated limits.

Additionally, the order book management device may be configured to output both the previous version and the new version of a book (corresponding respectively to the book state before the packet command is applied and after the packet command is applied), based on the information maintained in the cache's parts 210 and 212.

According to another aspect of the invention, order limits may be stored in sorted arrays (first data structure) maintained in top memory 201. The current depth of the book for both sides (bid and ask sides) may be stored in an internal memory in the Read Memory core 211, which allows reading only the minimal amount of memory to load a book in cache, thereby saving memory bandwidth. The processing core 24 is configured to receive input commands (such as add, delete, modify commands, etc.) and the first data structure representing the top-of-book, stored in cache memory 212, in the same clock cycle from the internal cache 21. By thus receiving both a command and data, the processing core 24 can identify the data to which the command is to be applied. The processing core 24 further comprises an array of comparators for comparing the price in the command with the price in each limit of the book.

According to one aspect of the invention, the processing core 24 is configured to process each input command 200 and the associated first data structure in three clock cycles, by processing the limits inside the first data structure in parallel and in a pipelined way (no Finite State Machine).

Figure 6:
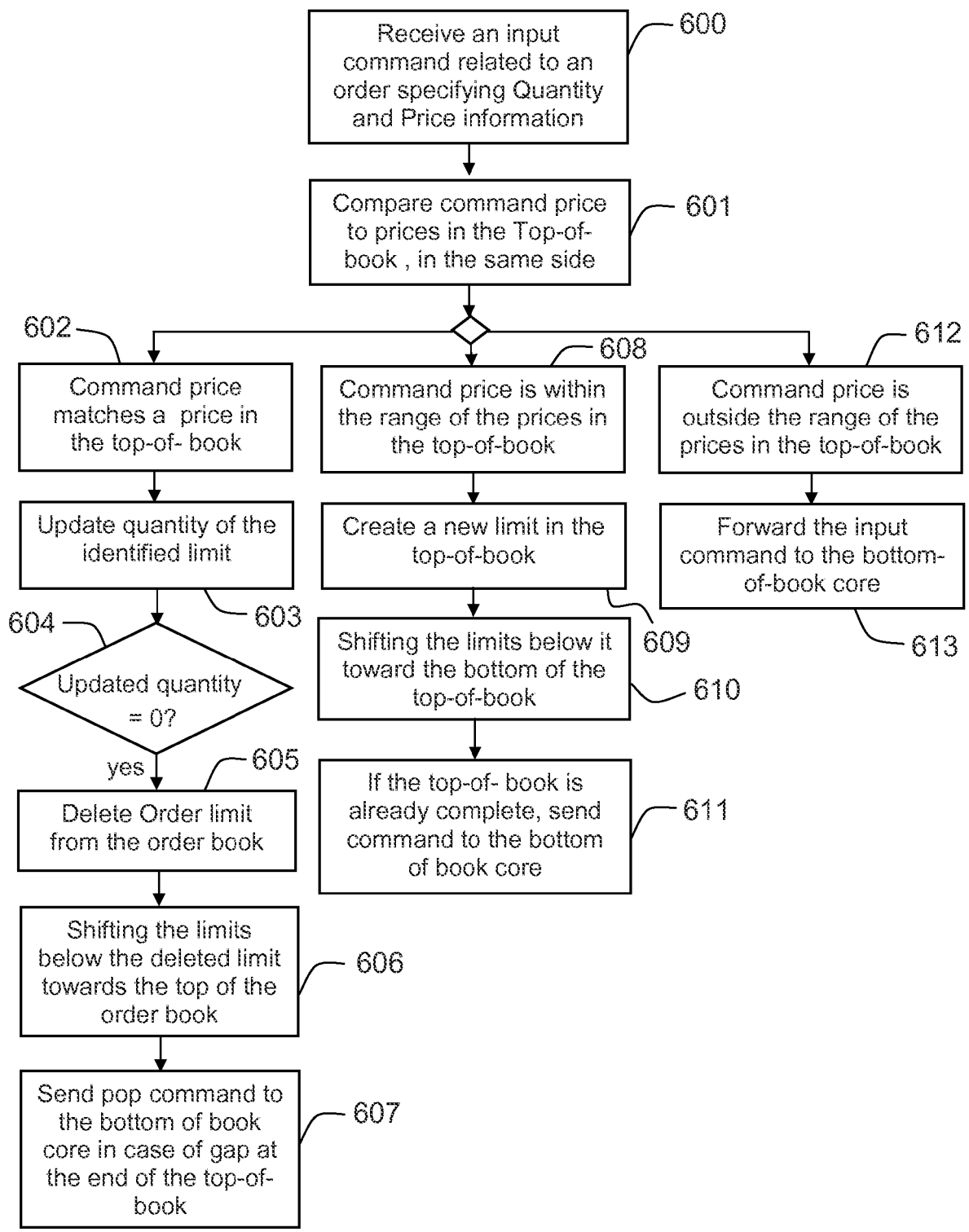
FIG. 6 is a flowchart illustrating the operation of the top-of-book management core, according to certain embodiments of the invention.

FIG. 6 is a flowchart of the steps performed by the top-of-book management core 2.

In response to an input command 200 related to an order (coming from a "by-order" or a "by-price" market) (step 600) associated with a price and quantity information, the price in the command is compared in step 601 with the price in each limit of the order book.

Based on the comparison results, a decision is made as regards the action to take. In particular, if it is determined in step 602 that the input command 200 relates to an existing limit (the command has the same price as an existing limit), such limit may be updated in step 603. If the update results in a quantity for the updated limit amounting to zero (step 604), the limit is then deleted from the order book (step 605), and the limits which are located below it in the order book are shifted toward the top of the book (step 606). If this creates or widens a gap at the end of the top-of-book, a pop command is sent to the bottom-of-book core 3, in step 607, in order to request the next limit in the top-of-book.

If it is determined that the price associated with the input command 200 is within the range of the prices associated with the existing limits in the top of the order book (step 608), a new limit is created in step 609, and the limits located below it are shifted toward the bottom of the book in step 610. If the top of the order book is already complete, a push command is sent to the bottom-of-book core 3, in step 611, to push the last limit to the bottom of the book.

If it is determined that the price associated with the input command 200 is outside the range of the prices in the top-of-book (step 612) and the top-of-book is already complete, the command is forwarded to the bottom-of-book core 3 in step 613.

In response to an input command 200 related to a limit (coming from a "by-limit" market), the limit at the provided level can be updated, ignoring the result of the price comparisons. A limit may be created or deleted, according to the opcode in the command and the resulting quantity, and the limits below it may be shifted up or down.

A decision code may then be generated for each limit, using the results of the comparators and the input operation code. The decision code is used to update each limit, and write back the result to the cache 21. This decision code can comprise the following codes:

A "Shift Up" code indicating that the limit at the considered position is to be copied from the position below it.

A "Shift Down" code indicating that the limit at the considered position is to be copied from the position above it.

An "Update" code indicating that the limit is to be updated using the input command (quantities and order counts will be added, while price is already the same)

An "Insert" code indicating that the limit is to be copied from the input command (price, quantity and order counts)

A "No Operation" code indicating that the limit keeps the same values.

For example, in response to the insertion of a limit at level 2, limits 0 and 1 will be given the "no operation" code, limit 2 will be given the "insert" code, and the limits under it will be given the "shift down" code.

According to another aspect of the invention, the top-of-book management core 2 may be arranged to fully exploit the level of parallelism offered by FPGAs and allows processing commands in as few clock cycles as possible. More specifically, limits may be compared in parallel, during the same clock cycle to the input command. The result of these comparators is then used to compute a decision code for each limit. Finally the resulting decision codes can be used to update the book. Accordingly, the whole updating process can take only 3 clock cycles, while a sequential processing on each limit would take as many clock cycles as limits in the top-of-book.

The bottom-of-book management core 3 is configured to manage the bottom part of each order book. The bottom part of each book can be updated more slowly than the top part of the book as the bottom part of the books is not sent to the output, and its processing time does not directly impact the total system's latency. Further, order books are generally small enough to fit completely in the top part. In most cases, modifications on the order book will not generate commands 26 to the bottom-of-book management core 3. Even for the books that are large enough to span across both management cores 2 and 3, many commands only relate to the top of the books.

As order books generally do not have a maximum depth and can expand infinitely in theory, more dense memories like DDR SDRAM (acronym for "Double Data Rate Synchronous Dynamic Random-Access Memory") may be used for storing the bottom part of the order book. To provide access to all the limits in the bottom part of the order books in a reasonable time, a specific data structure (also referred to as "second data structure" in the present description) is provided for the bottom part of the order book. The second data structure may be based on modified B+ trees. B+ trees consist of a root, internal nodes and leaves.

Contrary to binary trees, B+ trees have a very high fan-out, which means less memory accesses are needed to get from the root to the leaves, and as a result less latency to reach the right limit.

The B+ trees used for the bottom part of the order book, according to certain embodiments of the invention, may comprise one fixed-size root node and leaf nodes which are chained. The data structures composing the tree have thus fixed sizes, and the tree only comprises two levels: the level represented by the root node and the level represented by the leaf nodes.

Even if modified B+ trees present particular advantages, the bottom part of the order book may be based on other data structures. Such data structures may be chosen such that the bottom of book manager 3 is able to access every limit in a limited amount of time, preferably constant. For example, trees, which have a logarithmic access time, may be used for the bottom part of the order book. The following description will be made with reference to a bottom part of the order book based on a B+ tree data structure, for illustration purpose only.

In the embodiments of the invention where the order book management device 10 is integrated in data management platforms, regular DDR SDRAM (acronym for "Double Data Rate Synchronous Dynamic Random-Access Memory") memory may be used to store the leaves of the trees (bottom part of the order book), while QDR SRAM (acronym for "Quadruple Data Rate Static Random-Access Memory") memory may be used for the top of books and for the roots of the trees.

Figure 5:
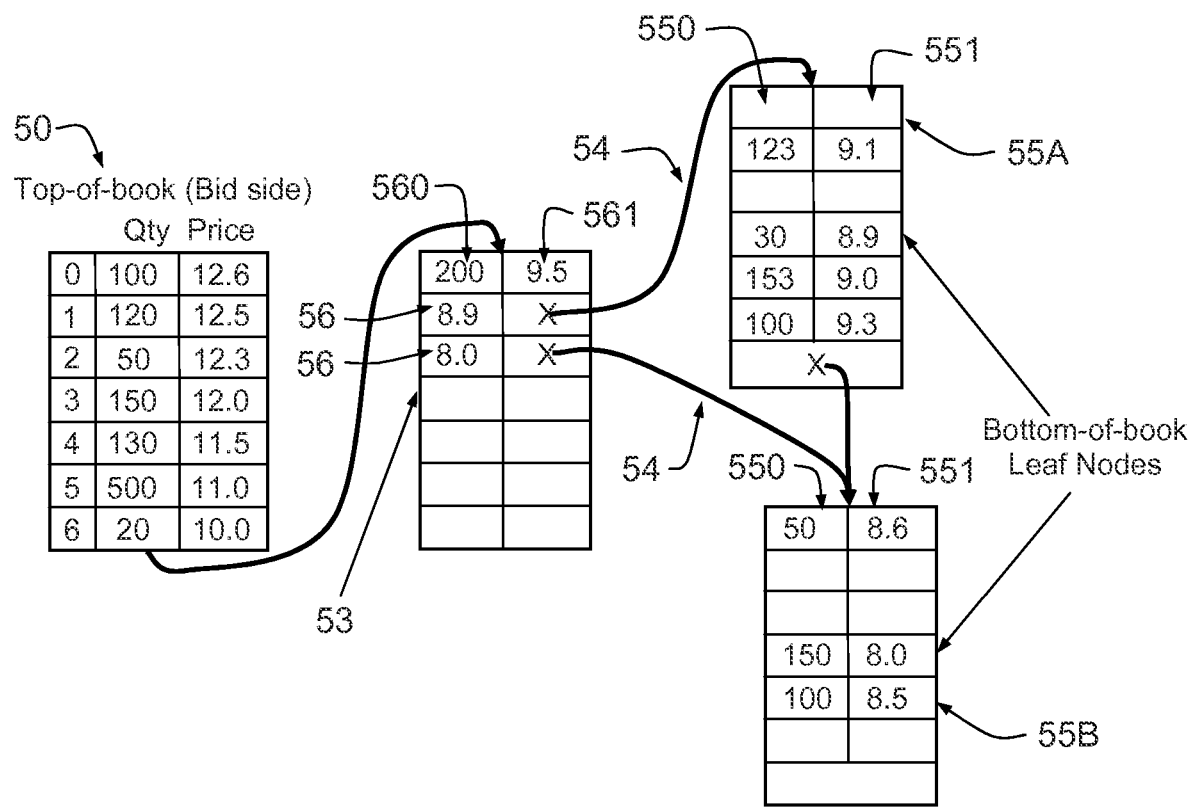
FIG. 5 represents exemplary bottom-of-book memory structures.

FIG. 5 represents exemplary data structures used for storing one side (bid or ask side) of an order book. As shown, the data structures comprise the top part of the order book 50 and a root node 53 and two leaf nodes 55 of the bottom part of the order book. The root node 53 comprises a first row comprising a quantity associated with a price, and in the other rows, it comprises pointers 54 to bottom-of-book leaf nodes 55 (two leaf nodes 55A and 55B are shown in FIG. 5), each leaf node pointer 54 being associated with a price 56 in the root node (also designated thereinafter as "reference price").

According to a preferred embodiment of the invention, the first row of the root node 53 comprises the best limit 560 of the bottom part of the order book. For the bid side, the best limit is the highest limit of the bottom-of-book and corresponds to the highest price among the limits of the bottom part of the order book. For the ask side, the best limit is the lowest limit of the bottom-of-book and corresponds to the lowest price among the limits of the bottom part of the order book for the ask side. This allows for a fast response to pop requests coming from the top-of-book management core 2. To facilitate the understanding of the embodiments of the invention, the following description will be made with reference to the bid side of an order book (the best limit corresponding to the highest price). However, the skilled person will readily understood that the same applies to the ask side (the best limit corresponding to the lowest price).

In the example of FIG. 5, the highest limit is associated with quantity "200" and price "9.5".

This involves computing a new highest limit out of the first leaf node 55A after emitting a response to the pop request (the new highest limit is represented in the example by the limit associated with quantity "100" and price "9.3"). A leaf node 55 includes a number of order limits, each order limit comprising a quantity 550 associated with a respective price 551. Each order limit may be further associated with an order count.

The prices 551 in each leaf node 55 range from a first value to a second value. The first value is the reference price 56 associated with the corresponding pointer 54 to the leaf node 55 in the root node 53 (this price being included in the leaf node 55). The second value is the price associated with the previous row in the root node 53, or alternatively the highest limit (the highest price in the root node) if the previous row is the first row of the root node, the second value being excluded from the considered leaf node. For example:

the prices in leaf node 55A range from value "8.9" to "9.3", as the pointer 54 to the leaf node 55A is associated with reference price "8.9" in root node 53 and the highest limit in the root node (first row) is associated with price "9.5" (there is no previous pointer 54 to a leaf node as leaf node 55A is the first leaf node).

the prices in leaf node 55B range from value "8.0" to "8.6", as the pointer 54 to the leaf node 55B is associated with reference price "8.0" in root node 53 and the leaf node in the previous row is associated with reference price "8.9" (excluded value).

Figure 7:
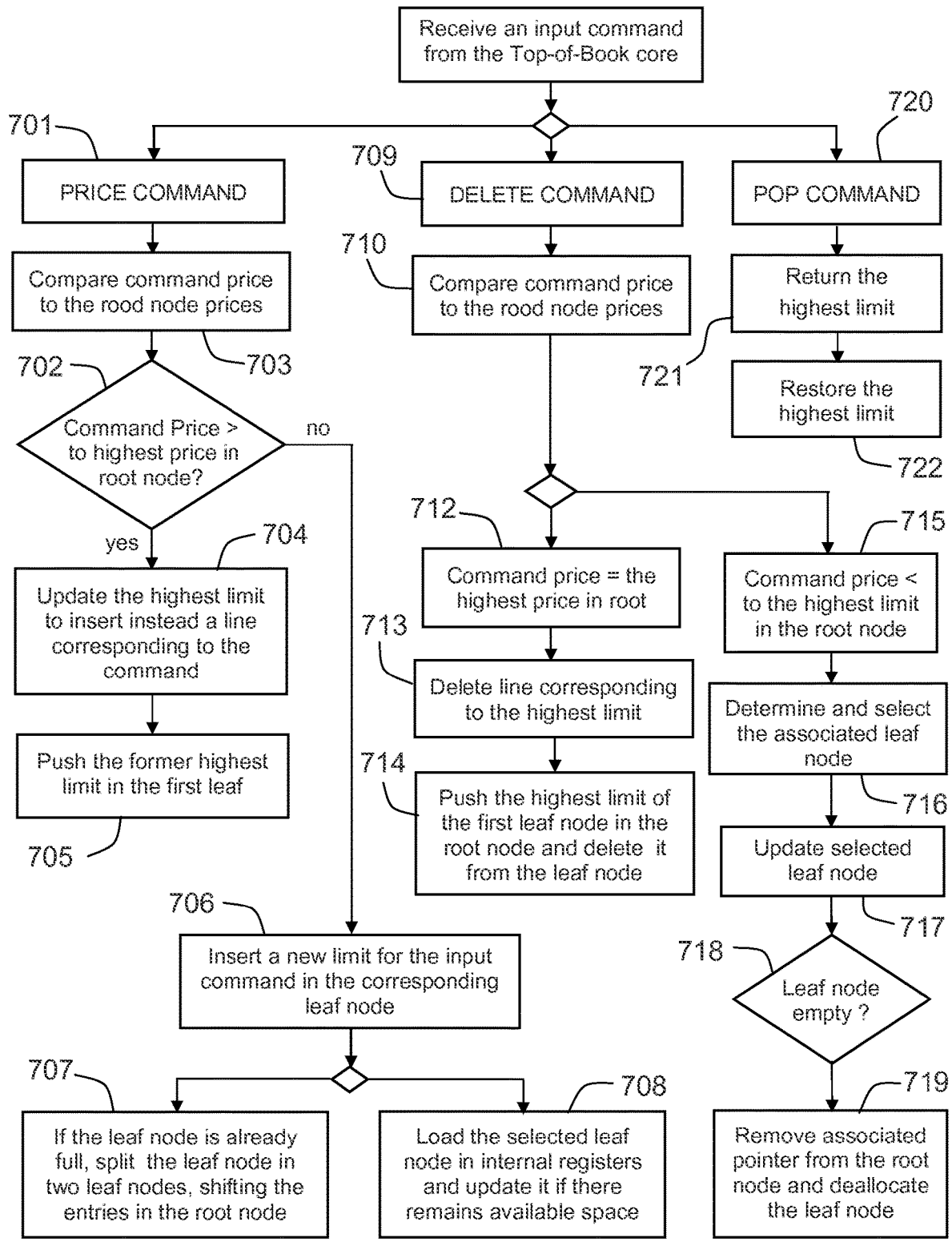
FIG. 7 is a flowchart illustrating the operation of the bottom-of-book management core, according to certain embodiments of the invention.

FIG. 7 is a flowchart of the steps performed by the bottom-of-book management core 3.

In response to an add or push command from the top-of-book core 2 associated with a price, thereinafter referred to as "price command" (step 701), the bottom-of-book management core 3 compares the price in the command to the prices in the root node 53 (step 702).

If it is determined that the price command is higher than the highest limit 560 in the root node 53 (step 703), then the highest limit is updated to insert instead a line corresponding to the command in step 704. The former highest limit is then pushed in the first leaf 55A in step 705. If this first leaf is already full, the contents of the root node are shifted so that leaf 1 becomes leaf 2, leaf 2 becomes leaf 3, etc, and a new first leaf is created, that contains the former highest limit.

If it is determined that the command's price is equal to the price of the highest limit 560 in the root node 53, then the command's and the highest limit's quantities and order counts are added up to form the new highest limit.

If it is determined that the price command is lower than the highest limit in the root node 53, then the new limit is inserted in the leaf node 55 corresponding to the pointer 54 having the higher reference price 56 among the reference prices that are lower than the price command in the root node 53, in step 706. For example, a command price amounting "8.2" will be inserted in leaf node 55B. The selected leaf node 55 is then loaded in internal registers, and updated, if there remains available space in the leaf node (708).

However, if the leaf node is already full, the leaf node 55 may be split in two leaf nodes, shifting the entries in the root node (step 707). This splitting is done by copying a part of the limits, the ones with the lowest prices, to a newly allocated leaf, and removing those limits from the "old" leaf. A pointer to the new leaf is then added to the root node 53, shifting the lower pointers down.

In response to a delete command (step 709) associated with a price (thereinafter referred to as "price command"), the bottom-of-book management core 3 compares the command price to the prices in the root node 53 in step 710.

If the price command matches the highest limit in the root node 53 (step 712), then the quantity and order count may be updated. To perform such update, the command's quantity and order count may be subtracted from the highest limit's quantity and order count respectively. If the new quantity and order count thus obtained are null, then the line corresponding to the highest limit is deleted in step 713. The highest limit of the first leaf node 55A is then pushed in the root node 53 and deleted therefrom in step 714.

If the price command is lower than the highest limit in the root node 53 (step 715), then the bottom-of-book management core 3 selects the leaf node 55 corresponding to the pointer 54 having the higher associated price 56 among the reference prices that are lower than the price command in the root node 53, in step 716. For example, for a command price amounting "8.3", leaf node 55B will be selected (FIG. 5).

The selected leaf node 55 is then loaded into internal registers, and updated by deleting the limit corresponding to the command price in step 717. If, as a result of the deletion of the limit, the selected leaf 55 becomes empty (step 718), its associated pointer 54 is removed from the root node 53, and the leaf is deallocated in step 719.

In response to a pop command received from the top-of-book management core 3 (step 720), the highest limit is returned after loading the root node 53 in step 721. This highest limit is then restored in step 722 by finding the highest limit in the first leaf, and possibly deleting this first leaf if it contained only one limit.

In certain embodiments of the invention, additional steps may be performed if the Delete command received at step 709 corresponds to a limit that does not exist. This Delete command would result in a "negative" limit associated with a negative quantity and a negative order count in step 717. Such situation could occur in situations where the commands are not executed in the exact same order as they are received in the decoders. As such, these situations have no important impact as the execution order is not taken into account for processing commands: the processing is based on removing and adding quantities and possibly order counts. For example, assuming a limit is deleted from the top-of-book. The top-of-book then sends a POP command to the bottom-of-book, which in turn replies with the first limit of its root node. Meanwhile, the top-of-book receives a delete command for the popped limit. As the limit does not exist in the top-of-book, a delete command is sent to the bottom-of-book. However, the bottom-of-book will not find the limit as it has sent it to the top-of-book. A negative limit is then created (717). This limit will be merged to the corresponding limit having positive quantity and order count values, namely the limit which was sent to the top-of-book as they have a same price. This processing may take some time depending on on-going actions on the book. However, this has limited impact as such merging will occur before the limit is moved up to the part of book provided to the client.

According to an aspect of the invention, leaves of the bottom part of the order book are not sorted by price, unlike the top part of the order book. This avoids shifting the limits inside the leaves when creating or deleting limits, thus reducing the amount of writes done to the leaves memory. It also reduces the amount of FPGA resources used.

Further, each leaf node may have a pointer 57 to the next leaf so as to allow chaining leaves when the root node 53 is full. Thus, the root node 53 can only point to some of the leaves.

In certain embodiments of the invention, leaves can comprise "holes" (empty limit positions) that correspond to limits that have been deleted. When adding a limit to a leaf, the first available position can be used, without requiring any sorting operation. Further, the deletion of a limit may only require setting the limit validity flag to zero. Accordingly, finding the highest limit of a leaf (to place it in the root node 53) only require prices comparison. Advantageously, such comparison can be done in a few clock cycles by exploiting the parallelism of an FPGA with a tree of comparators. The few clock cycles required for such comparisons are outweighed by the performance gain from saving memory bandwidth.

Figure 8:
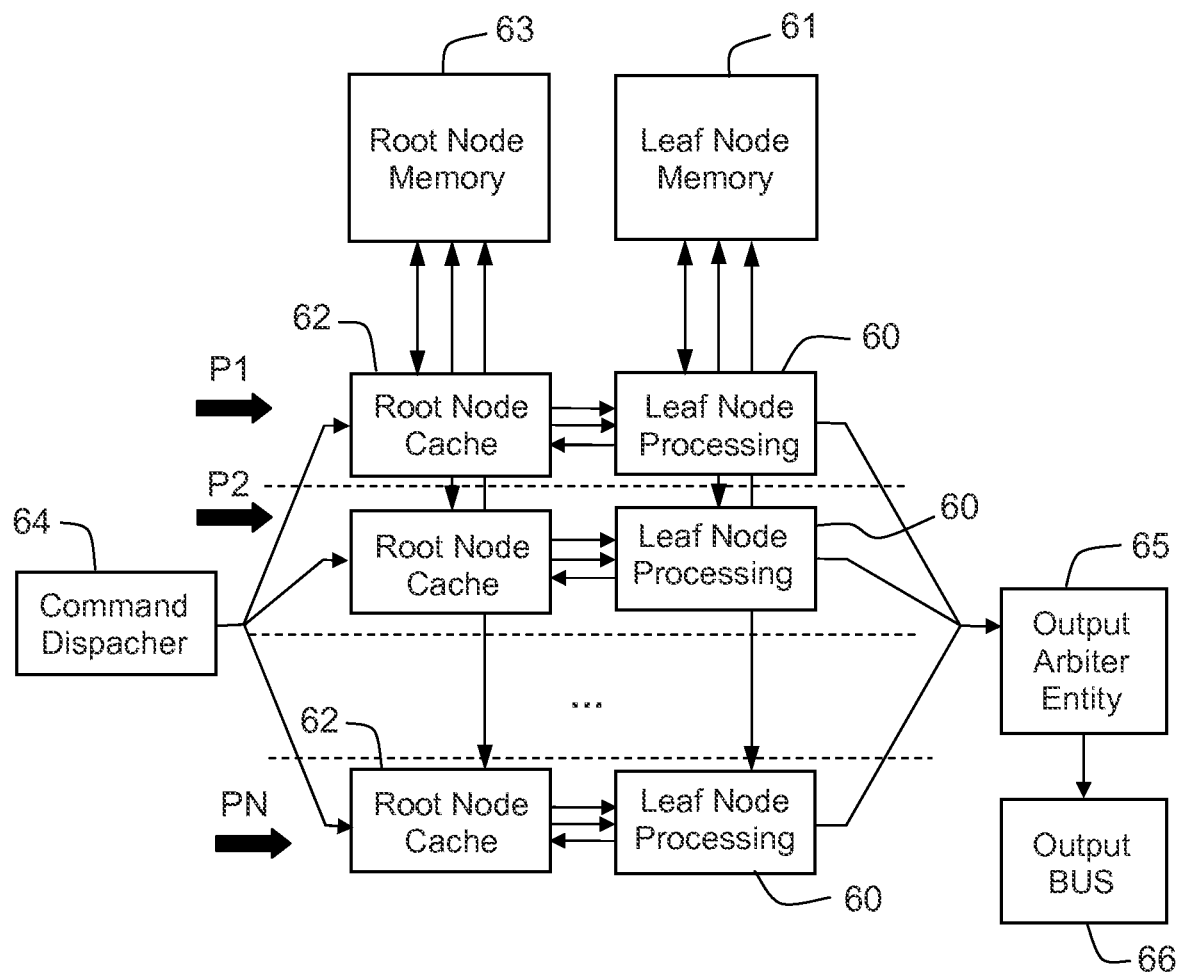
FIG. 8 shows the architecture of the bottom-of-book management core, according to certain embodiments of the invention.

With reference to FIG. 8, the processing part of the bottom-of-book management core 3 may be implemented by state machines 60. Several of those state machines can be put in parallel so that one state machine can wait for a leaf node to load while other state machines process a command on the node they have just loaded. This allows to have important leafs that take a long time to load (especially when DDR memory is used) and also a long processing time per command. Root node memories 63 are provided to store the root nodes 53 and the leaf nodes memories 61 are provided to store the leaf nodes 55. A command dispatcher core 64 dispatches the commands to the different processing cores so that all the commands for a given order book are sent to the same processing core. This avoids processing successive commands concerning the same book at the same time with their results overwriting each other. Further, an order book may be assigned to each processing core using the LRU algorithm.

Allocating and freeing leaf memory space can be performed by filling a FIFO (acronym for "First In First Out") with pointers to statically allocated memory blocks. Thus, when a leaf needs to be allocated, a pointer is read from the FIFO, and when a leaf is freed, the pointer is put back in the FIFO. This allows for cheap dynamic allocation of fixed-size memory blocks.

The root node caches 62 are provided to hide the latency effects of the memories 63 storing the root nodes 53. More particularly, they allow pipelining the reads while not being subject to the problem where a root node memory returns the result of a read which does not match the last write at the same address because the read order was emitted before the write order.

Additionally, the processing part of the bottom-of-book management core 3 may comprise an output arbiter entity 65 for mixing the commands from the leaf node processing cores 60 to provide them in a unique output bus 66. Further, two other arbiter entities (not shown) may be provided to allow each core 60 and 62 to access memories 61 and 63.

The FIFO comprising the pointers to the non allocated leaf nodes may be also connected to cores 60 through two associated arbiter entities, one for reading in the FIFO and the other for writing in the FIFO.

By separating the management of the top of the order book from the management of the bottom of the order book, and having both parts (2 and 3) work asynchronously, the invention provides an improved order book management device 10 having a low and constant latency. The dynamic aspect of the memory usage of the bottom-of-book management core 3 obviates the need for allocating space statically for each order book, which would require a huge amount of memory (biggest order book size expected multiplied by the number of books) and would place a hard limit on the maximum book size.

The invention presents several advantages over the prior art which include without limitation:
- the processing of the top management core 2 and the processing of the bottom management core 3 are asynchronous: the top management core 2 can answer "pop" commands without waiting for the bottom management core 3 before continuing to process its input commands;
- each limit may be associated with an order count;
- the Cache 21 can maintain both the old version and the new version of the books;
- The output comparators 23 allow the top-of-book management core to output only the limits that have been modified;
- The top management core 2 is cut into sub-cores forming a pipeline.

Figure 9:
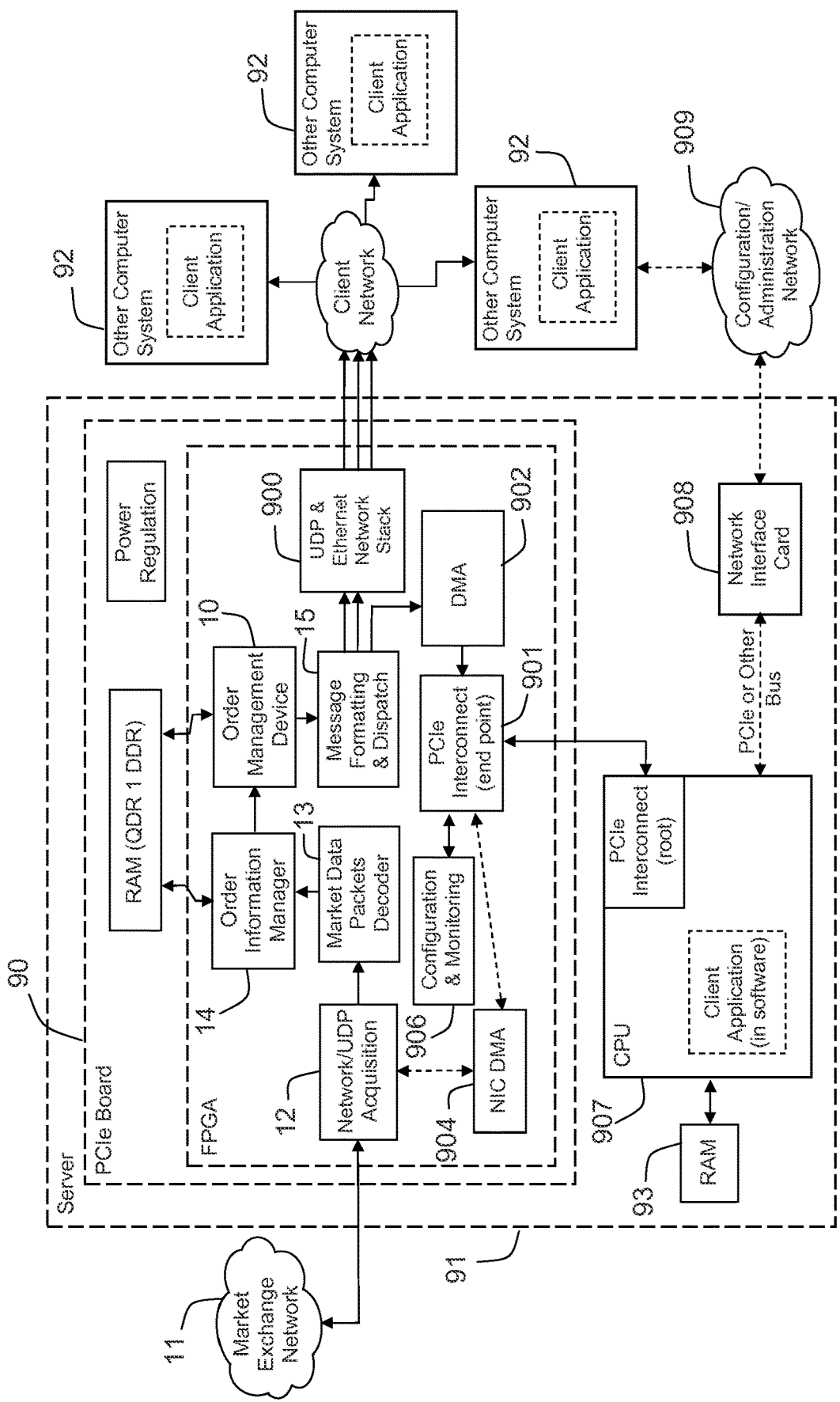
FIG. 9 is a block diagram illustrating an exemplary FPGA implementation in accordance with certain embodiments of the present invention.

FIG. 9 shows an exemplary implementation of the Market Data Processing system 100, in an FPGA on a PCIe Board 90 inside a standard server (host system) 91. The chain (Network/UDP Acquisition 12, Market Data Packets Decoder 13, Order Information Manager 14, Order Book Management Device 10, Message Formatting & Dispatch 15) represented in FIG. 1 may be complemented by:

- a UDP & Ethernet Network Stack 900 configured to send output messages on a standard Ethernet network. For an optimal performance, this core may be connected to the client network by as many Ethernet connections as clients on said network. Client applications in other computer systems 92 on that same network may be implemented in software, accelerated in hardware or alternatively completely implemented in hardware. Alternatively, client applications can be connected directly to the system's output ports, to save the latency added by the network equipment(s).
- A PCIe interconnect end point 901 configured to connect to the host system.
- a DMA ("Direct Memory Access") 902 configured to send output messages to the host system's RAM 93 via the Board's PCIe connection; a Client application can thus be run on the host system's CPU 907, and consume the messages sent by the DMA.
- A second "NIC" DMA 904 ("NIC" is the acronym for Network Interface Card) configured to receive and send Ethernet packets from/to the host system's software, through the Ethernet ports normally used by the Market Data Processing system's hardware. The PCIe board 90 can thus be seen as a normal Network Interface Card by the Operating System. This may be needed for various practical purposes (such as sending multicast group subscriptions, logging into the Market Exchange's systems, being able to check the connectivity). The important, latency-sensitive, data may be handled directly by the hardware, while the rest may be handled in software in certain embodiments. Such configuration also allows a direct connection to the exchange's network 11, without an extra hop through a network switch or router.
- configuration & monitoring logic 906 for configuring the other cores, including for example subscribing to financial instrument updates, and monitoring the system's status and performance through the PCIe connection. Software may be provided to be executed on the host's CPU 907, for exploiting this configuration & monitoring logic, through a software API.

Along the FPGA, the PCIe Board 90 provides memory chips which may be used by the Market Data Processing system 100 as "external memory", and various support functions such as power regulation to power the components on the Board with the various voltages they need. It may also include physical connectors for the multiple Ethernet connections.

Several of such Boards can be plugged in PCIe slots of a Host System. This allows to scale the processing power, in order to, for example, support more market exchanges. Boards can communicate with each other via the host's PCIe interconnect.

The Host System 91 may be a standard computer server. The CPU 907 may be chosen to have a direct PCIe connection to the PCIe board(s) hosting the Market Data Processing system(s), for maximum performance of the Client Application 908 run on it. The host system can also be equipped with a network interface 908 to connect to a Configuration and Administration Network 909. This allows to have a dedicated network for configuring and administration the server. The server can also be equipped with any standard component, such as a mass storage device (hard drive).

Physically separating the Market Exchange Network, the Client Network and the Configuration and Administration Network, has advantages in terms of security and performance.

Even if the invention is not limited to the use of PCIe to interface the FPGA to the Host System, the PCIe as particular advantages as it is currently the most widely used bus for high speed transfers between a server and add-on cards. The skilled person will however readily understand that the Market Data Processing system 100 could be interfaced via any other bus.

The foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention. In particular the invention is not limited to the described data structures used for the bottom part of the book. Other types of trees or heaps could be used alternatively, providing satisfying performances for access to deep limits in important books and a substantially constant latency.

In addition, even if the described embodiments of the invention were focused in one side (bid or ask side), both sides of the book may be loaded simultaneously in cache 21 and presented to the processing core 24 and subsequent cores, so as to integrate certain mechanisms in the FPGA in processing core 24 or between the order book management device 10 and the message dispatching unit 15.

The availability of both sides may be of particular interest for a "book de-crossing" functionality: the processing core 24 may be arranged to detect and correct "crossed books". A book is qualified as "crossed" if some of its limits on the bid side have a higher price than certain limits on the ask side. Generally, such condition is not satisfied as the "crossed" orders should be matched and executed by the exchange (except during phases where the market or an instrument is paused, like auction periods, or when the trading of an instrument is suspended). This can however happen if the system drops or otherwise misses some market data, and/or misses the deletion or execution of certain orders that then stay stuck at the top of the book. The processing core 24 may then remove the oldest crossed limit (i.e during an add on the bid side, if this add results in a crossed book, limits on the ask side may be removed until the book is not crossed anymore).

The invention claimed is:

1. An order management device implemented on an integrated circuit, said order management device comprising:
    an order aggregation memory associated with an object and configured in said integrated circuit, said order aggregation memory configured to receive data comprising orders originating from a network and aggregate said orders, each order having a value and a quantity, said order aggregation memory configured to associate the aggregated orders with limits in said order aggregation memory in response to input commands related to said orders, each limit being associated with a value and a quantity, each order being aggregated into the limit that has the same value as the order value, the quantity associated with a limit corresponding to the sum of quantities of orders which are aggregated, said order aggregation memory comprising:
    a first data structure having a fixed size, said first data structure storing data related to top of book orders associated with a set of P limits, the P limits being a subset of N limits and selected based upon performance selection criteria; and a second data structure comprising data relating to the bottom of book orders associated with the limits in the list of N limits that are not contained in the subset P, the entries in said second data structure being allocated dynamically;

a first management core configured in said integrated circuit to process an input command related to a top of book order stored in said first data structure, update said first data structure in response to the processing of said input command and generate and forward an update command related to a bottom of book order stored in said second data structure;

a second management core configured in said integrated circuit to update said second data structure in response to said update commands received from said first management core; and a message dispatch and transport component configured to format data from the first data structure and forward that data to a first client application;

wherein the first management core is configured to process the input commands in a pipelined way in a fixed number of clock cycles, independent of the set of P limits, and wherein the first management core and the second management core are configured to operate asynchronously, the first management core being configured to continue the processing of input commands independent of the update command processing performed by the second processing core, without waiting for the second management core to finish the processing or answer to the commands received from said first management core.

2. The order management device of claim 1, wherein said second data structure is a tree comprising a root node and at least one leaf node.

3. The order management device of claim 2, wherein the root node comprises a set of entries, each entry being associated with a reference value and a pointer to a respective leaf node, the entries in the root node being sorted by reference values, and wherein each leaf node comprises a non-sorted list of limits associated with respective values, the values in each leaf node ranging between a first value and a second value, the first value being the value associated with the corresponding pointer in the root node and the second value being related to the value associated with the previous pointer in the root node.

4. The order book management device of claim 3, wherein the root node comprises a first entry storing a limit of the second data structure of the book selected based upon said performance selection criteria, the second value of each leaf node being the value associated with said selected limit in the first entry, if there is no previous pointer to a leaf node in the root node.

5. The order management device of claim 4, wherein the first value is included in the leaf node and the second value is excluded from the leaf node.

6. The order management device of claim 1, wherein the first management core comprises an internal cache for loading the first data structure of each memory.

7. The order management device of claim 6, wherein an entry is allocated in said cache for each memory using a least recently used scheme.

8. The order management device of claim 2, wherein said tree is a B+ tree.

9. The order management device of claim 2, wherein the processing in the first management core is asynchronous with respect to the processing in the second management core.

10. The order management device of claim 1, wherein the first management core comprises a processing core configured to process each input command and the associated first data structure in three clock cycles, by processing the limits inside the first data structure in parallel and in a pipelined way.

11. The order management device of claim 10, wherein the first management core further comprises an array of comparators for comparing the value associated with the order identified in said input data stream with the value in each entry of the first data structure, and updating the first data structure and the second data structure based on the results provided by the comparators.

12. The order management device of claim 2, wherein the second management core comprises at least one state machine for processing each leaf node and the root node of said second data structure.

13. The order management device of claim 12, wherein the integrated circuit comprises at least one processing core, and wherein said state machine is implemented in parallel in said processing cores, a command dispatcher being provided for dispatching the commands generated by the first management core to the processing cores.

14. The order management device of claim 1, where the number of limits P in the first data structure is such that:

$$P*S=N*W$$

where N is an integer, S is the size of a limit in bits; and W is the memory word width in bits.

15. The order management device of claim 1, wherein the update command relates to the transfer of a limit between the first data structure and the second data structure.

16. The order management device of claim 1, wherein the order management device is configured to provide output based only on limits contained in the first data structure.

17. The order management device of claim 1, wherein said performance selection criteria consists of selecting the P limits having the highest value among said N limits.

18. The order management device of claim 1, wherein said performance selection criteria consists of selecting the P limits having the lowest value among said N limits.

19. An order management device implemented on an integrated circuit, said order management device comprising:

an order aggregation memory associated with a given object configured in said integrated circuit, said order aggregation memory configured to receive data comprising orders originating from a network and aggregate said orders, each order having a value and a quantity, said order aggregating memory including data structures configured to associate the aggregated orders with limits in response to input commands related to said orders, each limit being associated with a value and a quantity, each order being aggregated into the limit that has the same value as the order value, the quantity associated with a limit corresponding to the sum of quantities of orders which are aggregated, wherein said order aggregation memory includes two parts, each part comprising:

a first data structure having a fixed size, said first data structure storing data related to top of book orders associated with a set of P limits, the P limits being a subset of N limits and ordered based upon the value of said aggregated orders associated with said limits; and a second data structure comprising data relating to the bottom of book orders associated with the limits in the list of N limits that are not contained in the subset P, the entries in said second data structure being allocated dynamically;

a first management core configured in said integrated circuit to process an input command related to a top of book order stored in said first data structure, update said first data structure in response to the processing of said input command and generate and forward an update command related to a bottom of book order stored in said second data structure;

a second management core configured in said integrated circuit to update said second data structure in response to said update commands received from said first management core;

wherein the ordering of limits in the first data structures of each part is opposite; and a message dispatch and transport component configured to format data from the first data structure and forward that data to a first client application, wherein the first management core is configured to process the input commands in a pipelined way in a fixed number of clock cycles, independent of the set of P limits, and wherein the first management core and the second management core are configured to operate asynchronously, the first management core being configured to continue the processing of input commands independent of the update command processing performed by the second processing core, without waiting for the second management core to finish the processing or answer to the commands received from said first management core.

20. The order management device of claim 19, wherein the ordering of stored limits in the first data structure of one part of the order aggregating memory is based upon the highest P limits and the ordering of stored limits in the first data structure for the other part of the order aggregation memory is based upon the lowest P limits.

21. The order management device of claim 19, wherein each order represents an order on a tradable object and wherein the value associated with each order represents a buy or sell price associated with the tradable object.

22. A method of aggregating orders identified in input data streams into an order management system implemented in an integrated circuit, said method comprising the steps of:

maintaining an order aggregation memory associated with a given object configured in said integrated circuit, said order aggregation memory configured to receive data comprising orders originating from a network and aggregate said orders, each order having a value and a quantity, said maintaining step comprising associating the aggregated orders with limits in response to input commands related to said orders in said order aggregation memory, each limit being associated with a value and a quantity, each order being aggregated into the limit that has the same value as the order value, the quantity associated with a limit corresponding to the sum of quantities of orders which are aggregated, wherein said maintaining step further comprises the steps of:

storing, in a first data structure having a fixed size, top of book orders associated with a set of P limits, the P limits being a subset of N limits that are selected based upon performance selection criteria; and storing in a second data structure bottom of book orders associated with the limits in the list of N limits that are not contained in the subset P, the entries in said second data structure being allocated dynamically;

processing, in a first management core in said integrated circuit, input commands related to orders in said first data structure, updating said first data structure in response to the processing of said input commands, and generating in said first management core update commands relating to the bottom of book orders;

processing, in a second management core, updates to said second data structure in response to said update commands received from said first management core; and formatting data from the first data structure and forwarding that data to a first client application, wherein the processing of input commands in the first management core is performed in a pipelined way in a fixed number of clock cycles, independent of the set of P limits, and wherein operations in the first management core and in the second management core are asynchronous and wherein the processing of input commands in the first management core is continued independent of the update command processing performed in the second processing core, without waiting for the second management core to finish the processing or answer to the commands received from said first management core.

* * * * *